Oct. 25, 1966     F. D. DE JARNETT     3,281,022
SLIDING CUP INJECTOR
Filed Oct. 20, 1965
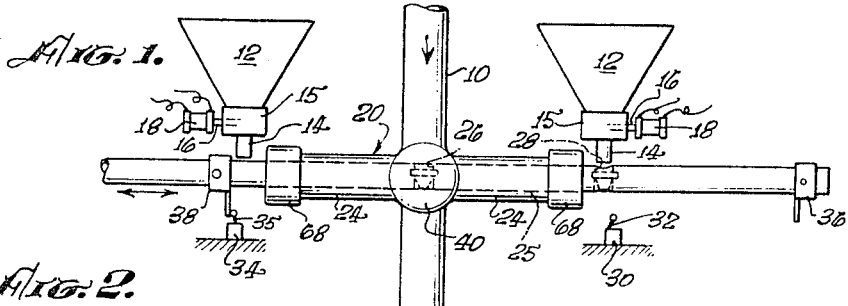
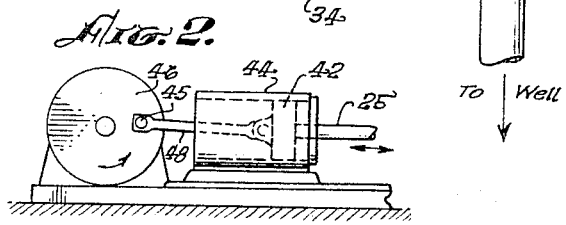
INVENTOR.
Frank D. DeJarnett,
By Jacob N. Roberts
ATTORNEY United States Patent Office 3,281,022
Patented Oct. 25, 1966

3,281,022
SLIDING CUP INJECTOR
Frank D. De Jarnett, 2150 Chestnut Ave.,
Long Beach, Calif.
Filed Oct. 20, 1965, Ser. No. 498,498
12 Claims. (Cl. 222—194)

This application is a continuation-in-part of my copending application, Serial No. 272,669, filed April 12, 1963, now abandoned.

The invention relates to improvements in means to introduce additives in various forms into a stream of highly pressurized fluid flowing through a conduit with a lateral passageway intersecting the conduit, wherein a feeder bar formed with a diametrical feed passage therethrough is longitudinally slidable through surrounding annular sealing means in the lateral passageway between a loading position with the feed passage exposed outside the lateral passageway and an unloading position with the feed passage aligned with the interior of the conduit for flow of the fluid stream therethrough. Such an arrangement for introducing additives into a pressurized fluid stream in disclosed, for example, in the Swearingen Patent 2,364,488, issued December 5, 1944, which disclosure is incorporated into the present disclosure by reference.

One feature of the invention is directed to the problem that arises from the fact that the highly pressurized fluid is trapped in the feed passage of the feed bar when the feed passage moves out of the lateral passageway into the atmosphere. If the pressurized fluid is a gaseous fluid under high pressure, say a pressure substantially in excess of 1000 p.s.i., the sudden release of the trapped gaseous fluid is a hazard as well as a nuisance.

The invention meets this problem by providing an expansion chamber radially outwardly of the interior of the lateral passageway which chamber has an inner wall apertured for communication with the interior of the lateral passageway and has an outer wall apertured for communication with the ambient atmosphere. This arrangement causes the pressurized fluid that is trapped in the feed passage to be vented after the feed passage passes beyond the previously mentioned sealing means and before the feed passage reaches the atmosphere.

The expansion chamber may be formed by a bushing in cooperation with the wall of the lateral passageway, the bushing being inserted into the lateral passageway and being recessed on its outer circumference to form the expansion chamber. The bushing is apertured to place the expansion chamber in communication with the interior of the lateral passageway and the outer wall of the lateral passageway is apertured to place the expansion chamber in communication with the ambient atmosphere. Suitable sealing means may be associated with the bushing to keep the trapped pressurized fluid from being vented through the outer end of the lateral passageway.

In the preferred practice of the invention described herein, the bushing is in the form of a follower or gland for compressing annular packing means to provide the previously mentioned annular sealing means through which the feed bar slides. Thus, the bushing has the dual function of not only providing the expansion chamber but also of keeping the annular sealing means under axial compression.

A second feature of the invention is directed to the problem of providing a feed passage in the feed bar that is of universal capability in the sense of being adapted not only to introduce additives in the form of solid bodies such as pellets, for example, but also to handle finely divided materials, including granular materials such as sand and including materials in powder form.

The invention meets this problem by providing the feed passage in the feed bar with a feed cup made of resiliently deformable elastomeric material. The feed cup has its open end directed upstream and has a discharge port on its downstream end, the material of the feed cup being biased to normally close the discharge port to retain additive material therein. The material of the feed cup yields in response to the dynamic pressure of the fluid stream exerted through the open end of the feed cup to open the discharge port when the feed cup is moved into alignment with the fluid stream.

The features and advantages of the invention may be understood from the following detailed description together with the accompanying drawing.

In the drawing, which is to be regarded as merely illustrative:

FIG. 1 is a somewhat diagrammatic side elevational view of a selected embodiment of the invention;

FIG. 2 is a diagrammatic view showing how a power means may be employed to reciprocate the feed bar shown in FIG. 1;

FIG. 3 is a fragmentary sectional view showing a portion of the feed bar with a diametrical feed passage therein and showing the construction of the lateral passageway;

FIG. 4 is a sectional view showing the construction of the feed cup in FIG. 3, the feed cup being shown in its closed state; and FIG. 5 is a sectional view along the line 5—5 of FIG. 4 showing the slits in the feed cup that form the discharge port.

In the drawings illustrating the selected embodiment of the invention, a conduit 10 communicates with the interior of an oil well and contains a gaseous fluid under high pressure, say substantially more than 1000 p.s.i., the purpose of which is to entrain additives for transportation into the oil well. The additives may comprise gravel, pellets of various materials, sand and other granular materials or materials in dust form. In the construction shown the additive is a granular material in the form of fine sand which is supplied by a pair of hoppers 12. Each hopper has a dispensing spout 14 through which the finely divided material is released in predetermined increments by a dispensing mechanism 15. The dispensing mechanism 15 is operated by a core or armature 16 of a solenoid 18, an increment being dispensed each time the solenoid is actuated.

A lateral passageway, generally designated 20 is unitary with the conduit 10 and intersects the conduit for the purpose of releasing material into the interior of the conduit. In the construction shown, the lateral passageway 20 has two opposite arms 24. What may be termed a feed bar 25 is slidingly mounted in the lateral passageway 20 and is provided with two spaced diametrical feed passages 26 and 28, the two feed passages being so spaced that when one of the feed passages is beyond the outer end of an arm 24 in register with one of the two feed spouts 14, the other feed passage is aligned with the fluid stream that is flowing downwardly in the conduit 10.

FIG. 1 shows the feed bar 25 at one limit of its reciprocation at which the feed passage 28 is below the right hand dispensing spout 14 and the other feed passage 26 is in axial alignment with the interior of the conduit 10. At the opposite limit of the reciprocation of the feed bar 25, the feed passage 26 registers with the left hand dispensing spout 14 and the feed passage 28 aligns with the axis of the conduit 10.

Any suitable means may be provided to energize the two solenoids 18 automatically for intermittently dispensing the finely divided material to the two feed passages 28. In the construction shown a normally open right hand switch 30 having an operating member 32 may be actuated for operation of the left hand solenoid 18. In like manner a normally open left hand switch 34 having an operating member 35 may be actuated to energize the right hand solenoid 18. A collar 36 is adjustably mounted on the feed bar 25 to close the right hand switch 30 and a second collar 38 is adjustably mounted on the feed bar to close the left hand switch 34.

FIG. 1 shows the normally open left hand switch 35 closed by the collar 38 to energize the right hand solenoid 18. When the movable parts are positioned as shown in FIG. 1, the energization of the right hand solenoid 18 has caused the right hand dispensing mechanism 15 to release a quantity of finely divided additive through the dispensing spout 14 into the right hand feed passage 28. When the feed bar 25 moves from this right hand limit position to the left, the switch 34 is initially opened by retraction of the collar 38 and subsequently the other collar 36 closes the normally open right hand switch 30 to energize the left hand solenoid 18 to cause an increment of the finely divided material to be released from the left hand hopper 12 into the feed passage 26. Thus, reciprocation of the feed bar 25 causes automatic loading of the two feed passages 26 and 28 alternately and causes automatic release of material from the two feed passages alternately into the interior of the conduit 10. The conduit 10 is preferably enlarged as indicated at 40 in the region of the intersection with the lateral passageway 20 to avoid restriction of the fluid stream by the feed bar 25.

The feed bar 25 may be reciprocated between its two alternate limit positions in any suitable manner. For example, as shown in FIG. 2, the left end of the feeder bar 25 may be connected to a piston 42 that is freely slidable in a guide cylinder 44. A crank 45 mounted eccentrically on a power actuated wheel 46 is operatively connected to the piston 42 by a pitman 48.

As best shown in FIGS. 4 and 5, each of the feed passages 26 and 28 is provided with a resiliently deformable elastomeric feed cup 50 which is suitably retained in the feed passage with the open end of the feed cup directed upstream and with the downstream end of the feeder cup provided with a normally closed discharge port that is adapted to open in response to the dynamic pressure of the fluid stream.

In the construction shown, each of the two feed passages 26 and 28 is formed with an inner circumferential groove 52 and a rim portion 54 of the feed cup 50 is dimensioned to seat into this groove and to be retained therein by a split retainer ring 55. The required discharge port may be formed in the feed cup 50, for example, by providing the lower end of the feed cup with one or more normally closed slits. As is best shown in FIG. 5 two intersecting slits 56 may be provided to form four quadrant tongues 58 which are normally sufficiently biased to their closed positions to confine any granular additive material that may be deposited inside the cup. When the feed cup is moved into the path of the fluid stream in the conduit 10, the dynamic pressure of the stream exerted through the upper open end of the feed cup forces the four tongues 58 to spread apart for release of the material as indicated in FIG. 3.

It is contemplated that each of the two arms 24 of the lateral passageway 20 will be of the construction shown in FIG. 3 wherein an annular sealing means surrounds the feed bar 25 to seal off the interior of the conduit 10. In the construction shown, the annular sealing means comprises annular packing 60 which backs against a ring 62 that abuts an inner circumferential shoulder 64 of the lateral passageway. In the construction shown a bushing or gland 65 abuts a spacer ring 66 to hold the packing 60 under axial compression and the axial pressure is provided by an outer bushing 68 that is in screw-threaded engagement with the outer end of the lateral passageway 20. In this instance, the outer bushing 68 thrusts a spacer sleeve 70 against a spacer ring 72 that abuts the outer end of the inner bushing 65.

In accord with the teachings of the invention, the outer periphery of the bushing or gland 65 is recessed to form an expansion chamber. In the construction shown, the whole outer circumferential surface of the inner bushing 65 is cut away to provide an annular expansion chamber 74. It is apparent that the inner bushing 65 forms the inner circumferential wall of the expansion chamber 74 and the tubular wall of the lateral passageway 20 forms the outer circumferential wall of the expansion chamber.

To provide communication between the interior of the lateral passageway 20 and the expansion chamber 74, the inner bushing 65 is provided with suitable apertures indicated at 75 in FIG. 3 and to provide communication between the expansion chamber and the ambient atmosphere, the tubular wall of the transverse passageway 20 is provided with at least one aperture or vent port 76. It is to be noted that none of the apertures 75 is in alignment with the one or more vent ports 76 with the consequence that the path of vent flow is a tortuous path.

In the preferred practice of the invention it is further contemplated that suitable sealing means will be provided to avoid any vent path along the interior of the lateral passageway 24 to the outer end of the passageway. For this purpose the inner bushing or gland 65 is provided with an inner circumferential groove to seat an inner O-ring 78 and the inner bushing is further provided with an outer circumferential groove to seat an outer O-ring 80. The inner O-ring 78 blocks vent flow longitudinally of the feeder bar 24 and the outer O-ring 80 blocks vent flow longitudinally of the inner circumferential surface of the lateral passageway 20. Thus, the outer O-ring 80 forms the outer end of the expansion chamber 74.

It is to be understood that the expansion chamber 74 need not be annular, i.e., need not extend all the way around the circumference of the inner gland 65.

The manner in which the invention functions for its purpose may be readily understood from the foregoing description. As the feeder bar 25 is reciprocated between its two alternate limit positions, increments of the finely divided additive are deposited in the two feed cups 50 in the two feed passages 26 and 28 alternately. As each feed cup 50 moves towards its unloading position on the axis of the conduit 10, the four tongues 58 at the discharge port of the feeder cup are tightly closed together to retain the finely divided additive. When a feed cup 50 loaded with the finely divided material reaches the interior of the conduit 10, however, the impact of the fluid stream against the upper open end of the dispensing cup forces the four tongues 58 to open positions to release the finely divided material for entrainment by the fluid stream.

When a feed passage 26 or 28 of the feed bar 25 and a feed cup 50 in the feed passage are shifted from the interior of the conduit 10 into one of the arms 24 of the lateral passageway 20, the feed cup first passes through the annular sealing means or compressed packing 60 with consequent trapping of the highly compressed fluid in the feed passage and in the feed cup in the feed passage. When the outwardly moving feed passage and the feed cup therein pass beyond the annular sealing means or packing 60 into the region of the vent apertures 75, the high compressed gaseous fluid trapped in the feeder passage and in the feeder cup therein is vented through the apertures 75 to enter the expansion chamber 74 and to escape from the expansion chamber 74 to the atmosphere through the one or more outer apertures or vents 76. The restricted vent paths desirably retard and prolong the venting of the trapped gaseous fluid to a suitable degree and the expansion of the fluid in the expansion chamber 74 produces a desirable drop in pressure which is eventually dissipated through the one or more outer vent apertures 76. By the time a feed passage 26 or 28 and a feed cup 50 therein reaches the inner O-ring 78 the pressure in the feed passage and in the feed cup therein is substantially at atmospheric pressure. In any event, the pressure of the trapped fluid drops to atmospheric pressure by the time the last of the apertures 75 is cleared. Thus, the venting arrangement results in the interior of each feed passage and the feed cup therein being at substantially atmospheric pressure when the feed passage and the feed cup therein emerge from the outer end of the lateral passage 20 to approach a loading position under one of the dispensing spouts 14.

My description in specific detail of the selected embodiment of the invention will suggest various changes, substitutions and other departures from my invention within the spirit and scope of the appended claims. For example, the collar 38 on the feed bar may be omitted with the two switches 30 and 34 positioned for operation by the collar 36.

I claim:

1. In a mechanism to introduce additives in various forms into a stream of highly pressurized fluid flowing in a given direction in a conduit with a lateral passageway intersecting the conduit, wherein a feed bar formed with a diametrical feed passage therethrough is longitudinally slidable through surrounding annular sealing means in the lateral passageway between a loading position with the feed passage exposed outside of the lateral passageway and an unloading position with the feed passage aligned with the interior of the conduit for flow of the fluid stream therethrough, the improvement comprising:

cylindrical means cooperative with the lateral passageway and surrounding the lateral passageway between the annular sealing means and the outer end of the lateral passageway to form an annular expansion chamber radially outwardly of the interior of the lateral passageway, said expansion chamber having an inner wall apertured for communication with the interior of the lateral passageway and having an outer wall apertured for communication with the ambient atmosphere to cause pressurized fluid trapped in the feed passage of the feed bar to be vented to the atmosphere through the expansion chamber after the feed passage reaches the annular sealing means and before the feed passage reaches the outer end of the transverse passageway.

2. An improvement as set forth in claim 1 which includes a second annular sealing means surrounding the feed bar beyond the apertured portion of the inner wall to prevent venting of the feed passage to the atmosphere through the outer end of the lateral passageway.

3. An improvement as set for in claim 1 in which the means cooperative with the lateral passageway to form the expansion chamber is a bushing inside the lateral passageway, the bushing forming the inner wall of the expansion chamber.

4. An improvement as set forth in claim 3 in which said second sealing means is retained by said bushing.

5. An improvement as set forth in claim 4 which includes annular sealing means surrounding the bushing and forming the outer end of the expansion chamber.

6. An improvement as set forth in claim 1 in which the apertures of the inner wall and the outer wall are staggered relative to each other to form tortuous vent paths to the atmosphere.

7. An improvement as set forth in claim 1
in which said first mentioned annular sealing means comprises packing and
in which said means cooperative with the lateral passageway is a gland holding the packing under axial compression,
said gland being recessed on its outer periphery to form the expansion chamber.

8. An improvement as set forth in claim 7 in which said gland is provided with an outer sealing ring to form the outer end of the expansion chamber and is further provided with an inner sealing ring to prevent venting to the atmosphere along the feed bar.

9. In a mechanism to introduce additives in various forms, including finely divided forms, into a stream of a pressurized fluid flowing in a given direction in a conduit with a lateral passageway intersecting the conduit, wherein a feed bar formed with a diametrical feed passage therethrough is longitudinally slidable through surrounding annular sealing means in the lateral passageway between a loading position with the feed passage exposed outside of the lateral passageway and an unloading position with the feed passage aligned with the interior of the conduit for flow of the fluid stream therethrough, the improvement comprising:

a feed cup positioned in said feed passage with its open end directed upstream of the conduit,
said feed cup being made of resiliently deformable elastomeric material and having a discharge port on its downstream end,
the material of the feed cup being biased to normally close the discharge port to retain additives in the cup,
the material of the feed cup being yieldable in response to the dynamic pressure of the fluid stream exerted through the opened end of the feed cup to open the discharge port when the feed cup is moved into alignment with the fluid stream.

10. An improvement as set forth in claim 9 in which said discharge port is formed by at least one normally closed slit in the bottom of the cup.

11. An improvement as set forth in claim 10 in which said discharge port is formed by two intersecting slits in the feed cup.

12. An improvement as set forth in claim 9 in which said feed passage is a bore with a circumferential groove therein, and
in which ring means cooperates with said groove to releasably retain the feed cup in the feed passage.

References Cited by the Examiner
UNITED STATES PATENTS

| | | | |
|---|---|---|---|
| 2,364,488 | 12/1944 | Swearingen | 222—148 |
| 2,766,911 | 10/1956 | Greaves et al. | 222—332 X |
| 2,827,208 | 3/1958 | Keller | 222—332 |
| 3,058,625 | 10/1962 | Greaves | 222—137 |

ROBERT B. REEVES, *Primary Examiner.*

HADD S. LANE, *Examiner.*